United States Patent
Catalano et al.

[11] Patent Number: 6,134,069
[45] Date of Patent: *Oct. 17, 2000

[54] METHOD OF POWER SAVING IN A DISK DRIVE APPARATUS WITH HEAD UNLOADING AND SPIN REDUCTION

[75] Inventors: Glen Catalano; Patricia M. Vincent, both of Boulder; Gary E. Counts, Arvada; Bruce D. Emo, Niwot, all of Colo.

[73] Assignee: Mobile Storage Technology, Inc., Boulder, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/846,513

[22] Filed: Apr. 29, 1997

Related U.S. Application Data

[63] Continuation of application No. 08/341,237, Nov. 17, 1994, abandoned.

[51] Int. Cl.[7] ............................. G11B 19/02; G11B 21/12
[52] U.S. Cl. ............................. 360/75; 360/73.03
[58] Field of Search .................. 360/78.04, 75, 360/53, 71, 73.03, 39, 48, 61, 69; 395/750; 318/560, 568.18

[56] References Cited

U.S. PATENT DOCUMENTS

| | | |
|---|---|---|
| 4,161,002 | 7/1979 | Saito . |
| 4,250,413 | 2/1981 | Kawasaki et al. . |
| 4,269,496 | 5/1981 | Motoori et al. . |
| 4,376,293 | 3/1983 | Teramura et al. . |
| 4,635,145 | 1/1987 | Horie ........................................ 360/78 |
| 4,636,905 | 1/1987 | Morimoto et al. . |
| 4,649,373 | 3/1987 | Bland et al. . |
| 4,684,864 | 8/1987 | Morimoto . |
| 4,717,968 | 1/1988 | Painton et al. . |
| 4,736,263 | 4/1988 | Takahashi et al. .................... 360/75 X |
| 4,783,706 | 11/1988 | Shoji et al. . |
| 4,933,785 | 6/1990 | Morehouse et al. ................. 360/78.04 |
| 4,980,836 | 12/1990 | Carter et al. . |
| 4,991,129 | 2/1991 | Swartz . |
| 5,005,088 | 4/1991 | Fukushima et al. ...................... 360/69 |
| 5,185,734 | 2/1993 | Call et al. . |
| 5,216,343 | 6/1993 | Genheimer et al. ............... 318/568.18 |
| 5,345,347 | 9/1994 | Hopkins et al. ........................... 360/71 |
| 5,408,367 | 4/1995 | Emo .......................................... 360/53 |
| 5,412,519 | 5/1995 | Buettner et al. ..................... 360/73.03 |
| 5,412,809 | 5/1995 | Tam et al. ................................. 395/750 |
| 5,452,277 | 9/1995 | Bajorek et al. ......................... 360/69 X |
| 5,493,670 | 2/1996 | Douglis et al. .................. 360/73.03 X |
| 5,625,514 | 4/1997 | Kubo et al. ......................... 360/105 X |

FOREIGN PATENT DOCUMENTS

| | | |
|---|---|---|
| 4-23269 | 1/1972 | Japan . |
| 60-171672 | 9/1985 | Japan .................................. 360/73.03 |
| 61-80657 | 4/1986 | Japan . |
| 62-129971 | 6/1987 | Japan . |
| 3-62374 | 3/1991 | Japan . |
| 4-11353 | 1/1992 | Japan . |

OTHER PUBLICATIONS

Richard Nass, "Improved Low–Power Modes Highlight 1.8–in. Drives," Electronic Design, pp. 47–48, 52, and 54, Apr. 18, 1994.

Translation of Kitamura, U.S. Patent and Trademark Office, Apr. 1996.

*Primary Examiner*—Paul Loomis
*Assistant Examiner*—James L Habermehl
*Attorney, Agent, or Firm*—Skjerven Morrill MacPherson LLP; Fabio E. Marino

[57] ABSTRACT

A method for operating a disk drive apparatus in the Idle Mode reduces power consumption while meeting non-operating shock and vibration specifications. This is achieved by operating the disk drive apparatus with the head in the loaded state with the disk rotating at a first rotational speed, unloading the head, and in Idle Mode, rotating the disk at a second rotational speed lower than the first rotational speed, with the electronics depowered.

6 Claims, 2 Drawing Sheets

METHOD OF POWER SAVING IN A DISK DRIVE APPARATUS WITH HEAD UNLOADING AND SPIN REDUCTION

This application is a continuation of application Ser. No. 08/341,237, filed Nov. 17, 1994 now abandoned.

FIELD OF THE INVENTION

This invention relates to disk drive apparatus, and more particularly, to a power saving method relating thereto.

DESCRIPTION OF THE PRIOR ART

In a miniature battery operated portable computer, the hard disk drive unit thereof requires a comparatively large amount of battery power. As a result, management of disk drive power consumption has become an important factor in extending battery life. Disk drive power management allows a computer system designer to find many useful combinations of reduced battery mass and longer operating time. Additionally, the disk drive of a portable computer is expected to endure severe shock and vibration specifications without producing data errors or without undergoing permanent damage.

To manage power consumption, a disk drive may have several modes of operation such as Active Mode, Idle Mode, and Sleep Mode. Idle and Sleep Mode must not penalize system operation by requiring excessively long delays before the drive is functionally available in Active Mode. During normal operation, a disk drive can be set to be in Active Mode allowing normal data access (including seeking, reading, and writing) to occur with full performance and with minimum delay. Disk drives of the continuous start-stop (CSS) type must either run at full speed in Active Mode or Idle Mode or be placed in the spun-down or stopped condition in Sleep Mode. When running at full speed and with the head in the loaded state, a CSS drive cannot survive non-operational shock specifications because the air bearing and suspension thereof cannot withstand the shock loads, causing the heads to crash into the data surface. When the disk is stopped and not rotating, the disk drive may endure non-operating shock and vibration specifications (the heads being in the parked state), but large power consumption transients occur when the spin motor starts and the heads are dragged across the disk. The disk must then be accelerated to full operational speed before the disk drive can be used, which may take 3–5 seconds.

Reference is made to U.S. Pat. No. 4,933,785, issued Jul. 12, 1990 for a description of a disk drive of this general type.

During Idle Mode in a CSS drive, most of the drive electronics may be depowered, but the spin motor, rotating at the same speed as if the drive were in the Active Mode, consumes the same power as an Active Mode. The transition between Idle Mode and Active Mode may be accomplished in about 100 milliseconds. While it would be desirable to consume less spin motor power during the Idle Mode, reduced disk rotational speed is not possible because the air bearing which supports the head in its loaded state requires a minimum linear velocity for stability. Reducing the linear velocity tends to cause the head to fly at a lower height relative to the disk causing increased sensitivity to head crashes caused by shock and vibration.

A disk drive employing dynamic loading may also operate in a low power Sleep Mode by unloading the head and stopping the spin motor, allowing shock and vibration protection. However, spinning the disk to operating speed and loading the head still requires large amounts of power and requires 3–5 seconds before the drive is available. The drive may also operate at full spin speed in the Idle Mode with the heads unloaded and the electronics depowered for reduced power consumption, startup time, and improved shock and vibration durability. While accomplishing the goal of meeting non-operating shocks specifications and access delays of 100 milliseconds or less, the power consumption of the spin motor is about the same as a CSS type drive in Active or Idle Mode.

SUMMARY OF THE INVENTION

The present method for operating a disk drive in Idle Mode reduces power consumption while meeting non-operating shock and vibration specifications. This is accomplished without long spin-up operational delays, thereby enabling the mode to be transparent to the computer system. This is achieved in the broad sense by operating the disk drive apparatus with the head in the loaded state with the disk rotating at a first rotational speed, unloading the head, and rotating the disk at a second rotational speed lower then the first rotational speed, with the head in its unloaded state, and with the electronics depowered.

BRIEF DESCRIPTION OF THE DRAWINGS

Reference is made to the drawings, in which.

DESCRIPTION OF THE PREFERRED EMBODIMENTS

Figure 1:
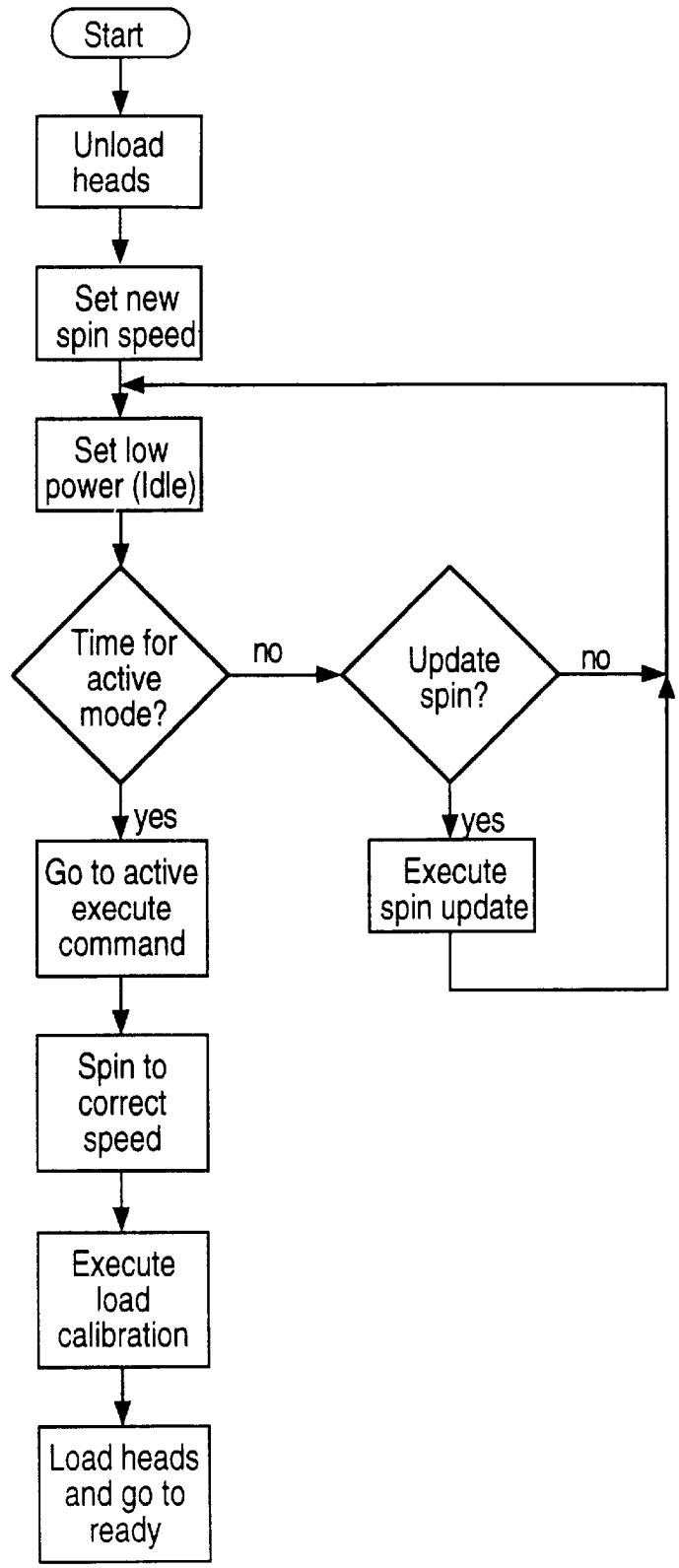
FIG. 1 is a first flow chart showing a first method of the present invention.

With reference to FIG. 1, in a disk drive employing dynamic loading, when entering the Idle Mode from the Active Mode, the heads are unloaded from the disk surface using ramp or other well known methods. When unloaded and parked, the heads can meet non-operating shock and vibration specifications.

Next, disk speed is reduced to balance reduced power consumption against spin-up time, to enter the Idle Mode. For example, 50% of normal operating speed will reduce power consumption approximately 20%. In miniature disk drives, electrical spin motor losses are comprised of linear factors such as bearing friction and exponential losses such as frequency related hysteresis loss of the magnetical core material.

Next, in entering the Idle Mode, unnecessary drive electronics are turned off and the microprocessor and control electronics are placed in a low power state, with the disk in a lower rotational speed state.

During the Idle Mode, the system questions whether it is time to return to the Active Mode. If the answer is no, such information is provided to update spin information in the Idle Mode.

In the event that it is desired to return to the Active Mode, the drive electronics, microprocessor and control electronics are placed in powered-up, active operating modes. The disk motor then accelerates the disk to operating speed. It is desirable to accelerate the disk quickly to operating speed and also to avoid loss conditions and large current transients to the power supply. Thus, a balance is necessary to determine the optimum Idle Mode speed for best power saving taking into account the Active/Idle duty cycle.

Next, recalibration routines are undertaken to normalize load servo system parameters. Finally, the heads are reloaded onto the spinning disk surface, and the Active Mode is resumed. The elapsed time to achieve Active Mode is about 1 second which does not require special system time-out intervention.

Figure 2:
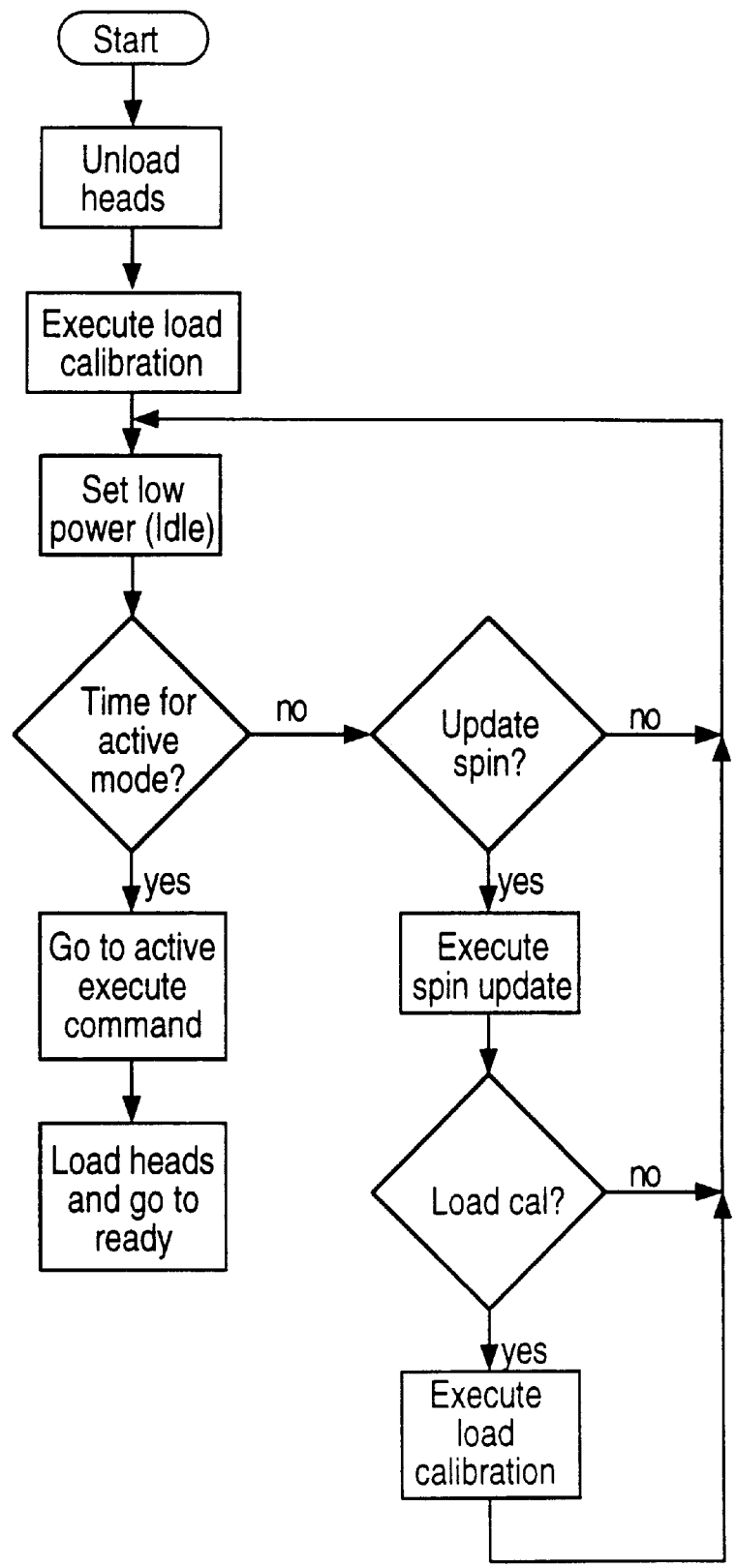
FIG. 2 is a second flow chart showing a second method of practicing the present invention.

As described above, when a dynamic head reload is executed, recalibration routines are normally required to normalize load servo system parameters. This procedure may take 700 milliseconds and must be completed before the drive is permitted to enter the Active Mode. When the present Idle Mode is enabled, in the system of FIG. 2, load recalibration routines are periodically executed while the head positioned on the cam surfaces is in the unloaded state. Recalibration is initiated at predetermined intervals, for example once every minute. Intervals are determined by the thermal history and other characteristics of the disk drive. The most recent calibration data is saved in a disk drive memory, and when the heads are next reloaded onto the disk, the disk drive will use the previously stored calibration information, bypassing the execution of the recalibration routines. Avoiding recalibration when going from Idle Mode to Active Mode allows the disk drive to enter the Active Mode from Idle Mode approximately 700 milliseconds sooner than it would have otherwise. Reducing the latency period improves disk drive availability, minimizing the performance penalty of using Idle Mode for power saving.

Another class of disk drives employs what is known as contact recording. These disk drives can also benefit from the described Idle Mode with an additional benefit of reduced head wear. This type of disk drive does not dynamically load or unload the heads from the disk. Heads and media, employing wear resistant materials and lubricants, are always in pre-loaded contact with the magnetic surface and do not fly above the surface as conventional disk drive heads do. Head life is proportional to the linear distance traversed by the contact type heads, therefore, reducing the disk rotational rate in the Idle Mode serves to reduce head wear.

We claim:

1. A method of reducing power consumption in a disk drive apparatus of the type wherein heads thereof may be loaded on and unloaded from disks and wherein an active mode comprises rotating the disks at a first rotational speed, disk drive electronics on, and the heads loaded, wherein the method of reducing power consumption comprises:

unloading and parking the heads;

rotating the disks at a selected second rotational speed wherein said second rotational speed is lower than said first rotational speed and greater than zero speed; and periodically recalibrating the head oading routine with the head in its unloaded state.

2. The method of claim 1, further comprising the step of saving the most recent recalibration data in memory, and accessing the data when the head is loaded, so as to avoid recalibration during loading of the head.

3. The method of claim 1, further comprising the step of depowering selected disk drive electronics.

4. The method of claim 1, wherein said second selected speed is selected to minimize spin up time when returning to the active mode and to minimize power consumption.

5. The method of claim 1, wherein the disk drive apparatus is a hard-disk drive.

6. The method of claim 1, wherein unloading and parking the heads further comprises:

unloading the heads from the disk surface using a ramp; and parking the heads.

* * * * *